United States Patent [19]

Moya et al.

[11] Patent Number: 5,142,932

[45] Date of Patent: Sep. 1, 1992

[54] FLEXIBLE ROBOTIC ARM

[75] Inventors: Israel A. Moya, Laurel; Philip A. Studer, Silver Spring, both of Md.

[73] Assignee: The United States of America as represented by the Administrator of the National Aeronautics and Space Administration, Washington, D.C.

[21] Appl. No.: 754,828

[22] Filed: Sep. 4, 1991

[51] Int. Cl.⁵ .................... B25J 17/00; B25J 18/06
[52] U.S. Cl. ...................................... 74/479; 310/82; 310/112; 901/9; 901/23; 901/28
[58] Field of Search .................... 74/479; 310/82, 112, 310/114; 901/9, 19, 23, 28

[56] References Cited

U.S. PATENT DOCUMENTS

| | | | |
|---|---|---|---|
| 3,579,276 | 5/1971 | Newell | 310/82 |
| 4,107,948 | 8/1978 | Molaug | 901/28 |
| 4,393,728 | 7/1983 | Larson et al. | 74/479 X |
| 4,585,387 | 4/1986 | Jayne | 901/24 X |
| 4,685,349 | 8/1987 | Wada et al. | 74/479 |
| 4,693,663 | 9/1987 | Brenholt et al. | 901/22 X |
| 4,708,578 | 11/1987 | Richter | 901/21 X |
| 4,766,775 | 8/1988 | Hodge | 901/23 X |
| 4,828,453 | 5/1989 | Martin et al. | 901/28 X |
| 4,837,470 | 6/1989 | Tamura | 310/82 |
| 4,854,808 | 8/1989 | Bruno | 74/479 X |
| 4,904,148 | 2/1990 | Larsson | 901/23 X |

Primary Examiner—Allan D. Herrmann
Attorney, Agent, or Firm—R. Dennis Marchant; Guy M. Miller; Paul S. Clohan, Jr.

[57] ABSTRACT

A plurality of identical modules are serially connected together with each module including a base plate and a top plate interconnected by a universal joint assembly so that the top plate is adapted to pivotally nutate around the base plate to describe a cone in space. An array of twenty-four electromagnets, sequentially energized in sets of three, are arranged in a ring around the periphery of the base plate. Selective energization of the eight sets of electromagnets causes the rim of the top plate to be magnetically attracted to the energized electromagnets. The tilt of the top pivot plate is detected and controlled over a range of 360°, thus permitting a series string of modules to assume any desired elongated configuration.

20 Claims, 3 Drawing Sheets

FLEXIBLE ROBOTIC ARM

This invention was made by employees of the United States Government and therefore may be used by or for the Government for governmental purposes without the payment of any royalties thereon or therefor.

BACKGROUND OF THE INVENTION

1. Field of the Invention

This invention relates generally to a robotic arm and more particularly to a flexible robotic arm comprised of a plurality of series connected modular sections.

2. Description of the Prior Art

Conventional robotic arms generally fall into two categories, one being a structure which is similar to the human arm and having shoulder, elbow and wrist joints, the other being a serpentine type of structure comprised of a plurality of pivotally connected links. Both types of arms include means for selectively moving the respective parts so that an element located or grasped at the far or distal end can be manipulated and placed at a predetermined destination or alternately retrieved therefrom. The selection of the particular type of robotic arm utilized depends on its intended use, whether it be for supporting and/or manipulating a tool, or for the grasping and positioning of a structural element.

SUMMARY

It is an object of the present invention, therefore, to provide an improvement in robotic apparatus.

It is another object of the invention to provide an improvement in robotic arms.

It is a further object of the invention to provide an improvement in flexible robotic arms.

And it is yet another object of the invention to provide an improvement in flexible robotic arms which can operate in outer space with low energy consumption, has a large degree of flexibility for obstacle avoidance, and is extremely reliable.

Briefly, the foregoing and other objects are achieved by a serpentine type of robotic arm comprised of a plurality of identical modules which are serially connected together. Each module includes a base plate and a top plate interconnected by a universal joint assembly so that the top plate is adapted to pivotally rock around the base plate to describe a cone in space. This operation is provided by a plurality of individually energized electromagnets arranged in a ring around the periphery of the base plate. Selective energization of the electromagnets causes a rim portion of the top plate to be magnetically attracted to the electromagnet(s) which are energized. The tilt or cocked position of the top pivot plate is a controllable nutation over a range of 360°, thus permitting a series string of modules to assume any desired elongated configuration.

BRIEF DESCRIPTION OF THE DRAWINGS

The following detailed description of the invention will be more readily understood when considered together with the accompanying drawings in which.

DETAILED DESCRIPTION OF THE INVENTION

Figure 1:
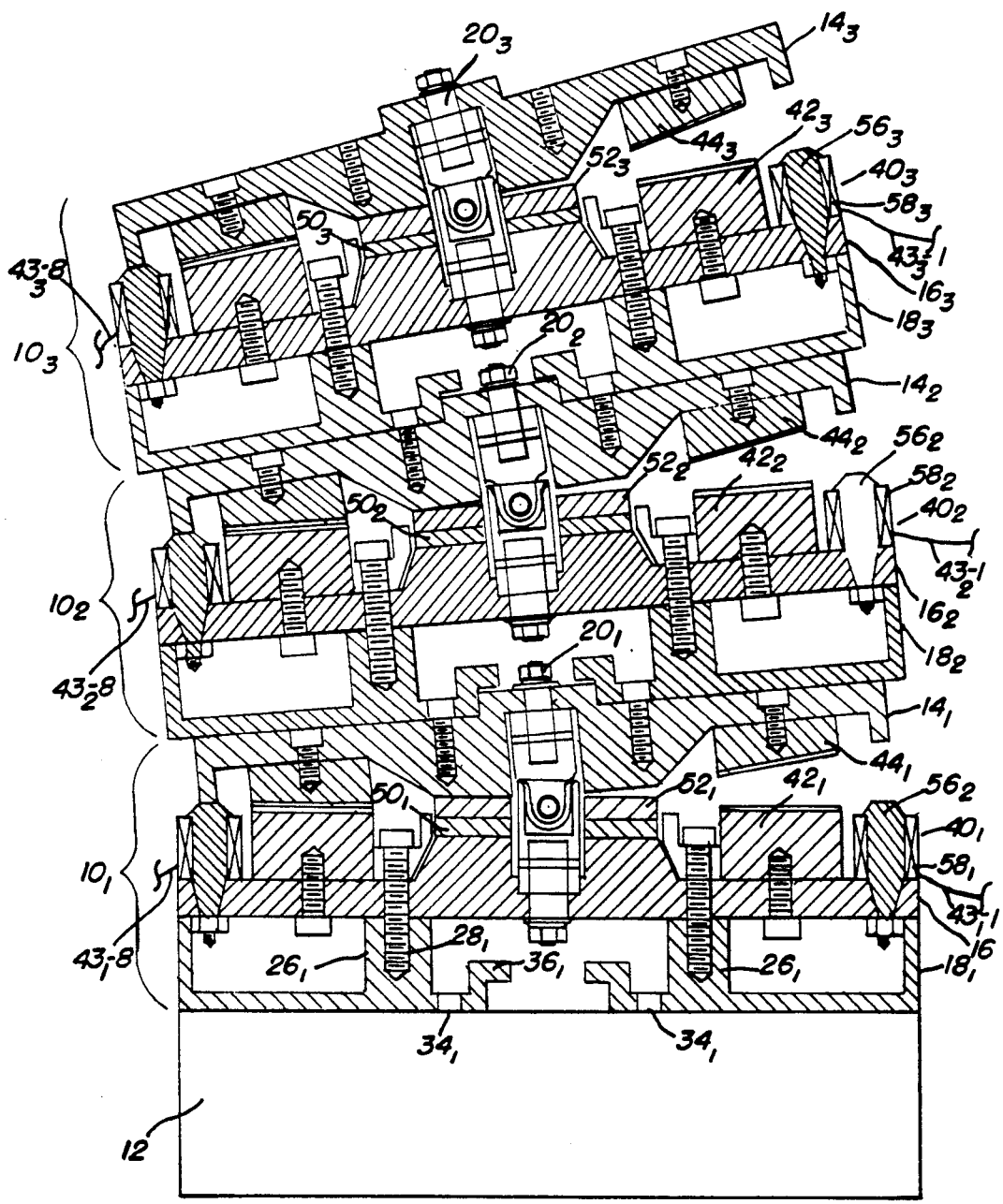
FIG. 1 is a partial central longitudinal cross section of a first embodiment of the invention.

Referring now to the drawings wherein like reference numerals refer to like parts throughout, in FIG. 1 there is shown a serially connected string of three identical modules $10_1$, $10_2$ and $10_3$ of a flexible robotic array, with the lowest module $10_1$ being further shown secured to a support member or pedestal 12.

Figure 3:
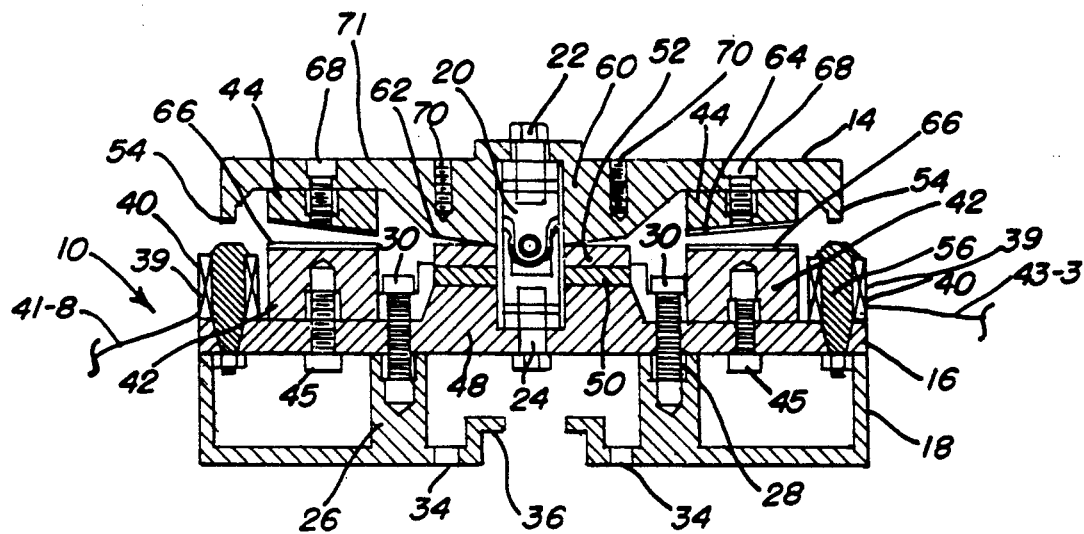
FIG. 3 is a central longitudinal cross section of one module of the embodiment shown in FIG. 1.

As further shown in FIG. 3, each module 10 of the embodiment shown in FIG. 1 is comprised of three major parts, a generally circular top plate 14 which is pivotally connected to a circular base plate 16 and a circular interface plate 18. The pivotal connection between the top plate 14 and the base plate 16 is by way of a universal joint assembly 20 which is held in place by a pair of fastener elements 22 and 24 which may consist, for example, of a pair of metal screws or bolts as shown.

The interface plate 18 provides a means whereby the base plate 16 of one module can be coupled to the top plate 14 of the next module and is basically comprised of an annular intermediate section 26 which include a circular arrangement of threaded bores 28 for receiving fastening elements, e.g. metal screws 30 for attaching the base plate 16 located on the top thereof. Inwardly adjacent the section 26 is a circular arrangement of bolt holes 34 and shoulder portions 36 for seating and attachment to a top plate 14, not shown, of the module which is attached thereto directly beneath it.

Figure 2:
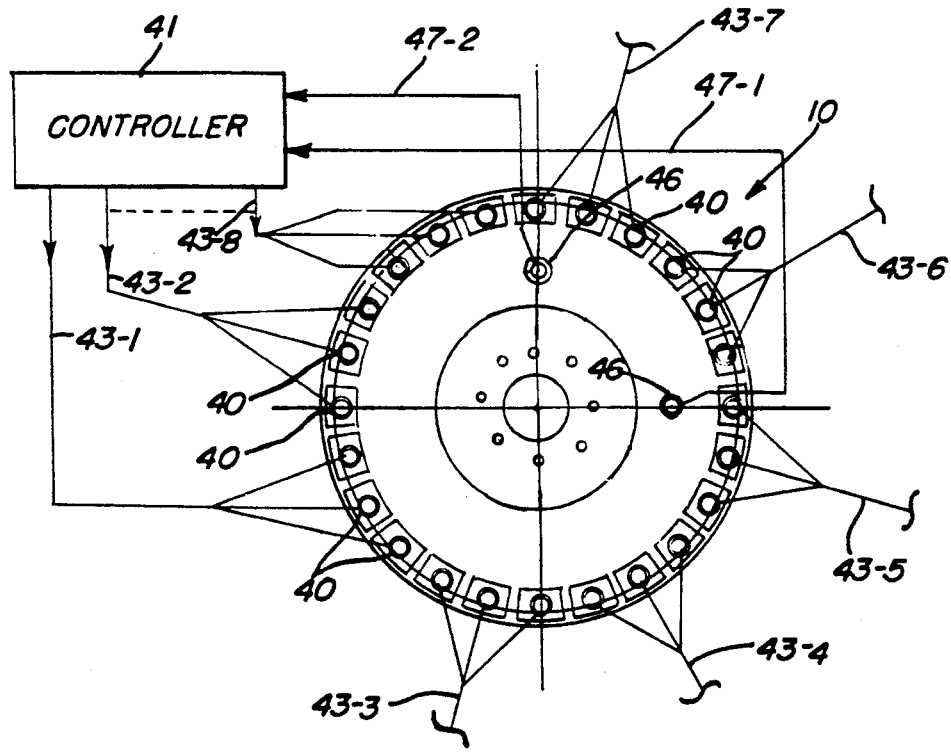
FIG. 2 is a schematic diagram illustrative of the planar arrangement of electromagnets and positional feedback components utilized in operating each module of the flexible robotic arm according to the subject invention.

With respect to the base plate 16, it is comprised of a generally circular metallic member on which there is mounted a plurality, typically twenty eight, of equally spaced electromagnets 40, including coils 39, arranged on the periphery as schematically shown in FIG. 2 and which are energized in sets of three from a controller 41 via the wiring assemblies 43-1 ... 43-8. Inwardly of the ring of electromagnets 40 is one half of a capacitive type proximity sensor comprised of a segmented annular ring 42 and a plurality of capacitor plates 66 which oppose the other half of the proximity sensor comprised of a plurality, typically twenty-eight top segments 44 and capacitor plates 64, which are secured to the underside of the top plate 14 as shown in FIG. 3.

Figures 4, 5:
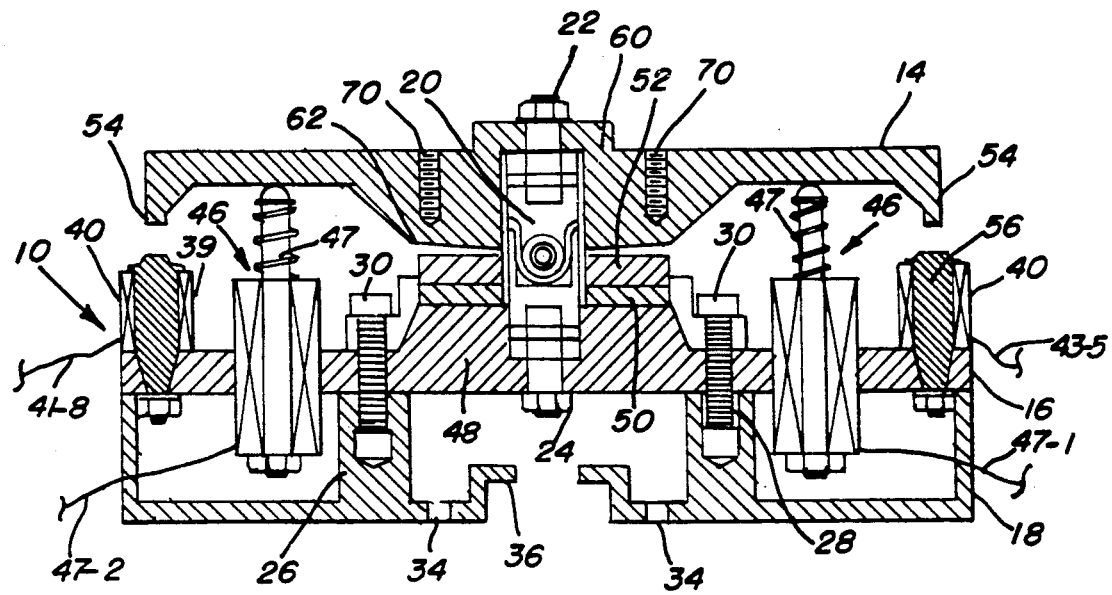
FIG. 4 is a central longitudinal cross section of one module of a second embodiment of the invention.
FIG. 5 is an electrical schematic drawing illustrative of the driver circuit utilized for energizing sets of three electromagnets shown in FIG. 2.

In the second embodiment of the invention shown in FIG. 4, the capacitive type proximity sensor is deleted in favor of an electromagnetic type sensor including two positional determining elements 46 comprising well known linear variable differential transformers (LVDT) 46. The LVDT's 46 are energized by and feed top plate positional signals back to the controller 41 by electrical wiring assemblies 47-1 and 47-2 shown in FIG. 2.

Further as shown in FIG. 3, the segmented bottom ring 42 is held in place by suitable hardware such as one or more selectively spaced bolts 45. In the center of the base plate 16, as shown in both FIGS. 3 and 4, is a raised island portion 48 which in addition to providing a mount for the centrally located universal joint assembly 20, also provides a supporting surface for a generally flat annular shaped permanent magnet 50 over which is placed a like shaped metal spacer member 52.

The top plate 14 comprises a generally circular metallic member having an inverted concave periphery including a lower outer edge 54 which is adapted to contact the upper surface of pole pieces 56 of the electromagnets 40. The top plate 14 acts like a rocker plate and further includes an enlarged midsection 60 having a beveled bottom surface 62 which is adapted to contact the upper surface of the underlying spacer member 52 located on the base plate 16.

Between the inverted rim surface 54 and the midsection 60 of the top plate there is, as noted above, is the set of capacitor segments 44 which are aligned with the capacitor segments 42 of the base plate 16. Each of the top segments 44, moreover, include respective outer surface portions which are beveled along the same line as the beveled surface 62 and include the capacitor plates 64 which became parallel with the lower capacitor plates 66 when the top plate 14 is attracted magnetically towards any one set of three energized electromagnets 40 as shown in FIG. 2. The top ring segments 44 are secured to the top plate 14 by a set of fastening screws or bolts 68. The top plate also includes a set of circularly arranged threaded bores 70 on its upper surface 71 for attachment to the interface plate 18 of another module 10 which will be mounted on top of the top plate 14.

Energization of the circular array of electromagnets 40 and more particularly their respective coils 39 are energized in sets of three coils each as noted above. Circuitry for providing the energization is shown in FIG. 5 and is located in the controller 41. Referring now to FIG. 5, shown thereat are three electromagnet coils 39 connected in series between the collector 72 of an n-p-n transistor 74 and a +V supply potential applied to terminal 76. The transistor 74 comprises the output transistor of an emitter follower circuit configuration including n-p-n transistor 78, the base 80 of which is coupled to an input terminal 82. Terminal 82 is adapted to receive a turn-on signal when energization of the coils 39 is required. Resistor 84 acts as the collector load resistor for transistor 78 while resistors 86 and 88 comprise base bias resistors therefor. A diode 90 is further shown coupled in parallel with the three coils 39 and provides a discharge path therefor upon deenergization.

In operation, each of the modules $10_1 \ldots 10_n$ is composed of the same basic components as an electric motor having a stator and a rotor except that the stator and rotor are arranged differently and take a different form. In the module 10, the base plate 16 comprises the stator and incorporates both the central permanent magnet 50, the spacer 60, which in actuality comprises a magnetic flux carrier washer, and the circular array of electromagnets 40 comprised of the respective pole pieces 56 and windings 39 arranged around the outer perimeter thereof. The top plate 14 corresponds to a motor rotor. The difference is that it nutates, i.e. has a conical rotation, instead of a rotation about a single centralized axis. Here the top plate 14 conically pivots around the universal joint 20 in response to the instantaneous magnetic state of the base plate 16.

It should also be pointed out that the permanent magnet 50 which also comprises a ring, provides a clamping force between the two plates 14 and 16 and contributes significantly to the torque capability of the device. The torque T, for any point in time, is:

$$T \approx 4CB_{coil}B_{pm} \qquad (1)$$

where C is a constant that relates to the area and distance from the point of minimum gap to the centroid of the area containing the effective flux density of a coil 39 and $B_{pm}$ is the flux density due to the presence of permanent magnet 50 at that particular location.

Accordingly, when three series connected coils 39 of the sets of electromagnets 40 are energized in a sequential fashion, from the left and right of a point of minimum gap, one set of electromagnets will be pulling on one side of the top plate 14, while the other set will be pushing on the opposite side.

While respective capacitance readings can be obtained from the opposing sets of plates 64 and 66 to determine the position of the top plate 14 relative to the bottom plate, the linear variable differential transformers 46 provide an output voltage between a predetermined maximum and minimum voltage which is a function of the depression of the respective plunger elements 47 by the top plate 14. Each LVDT output voltage is converted into an angle in the controller 41 which enables a formulation of the correct angle of the top plate relative to a datum, or reference point on the periphery. The double inclusion of the linear voltage differential transformers 46 eliminates any quadrant ambiguity which is possible with a single LVDT plate position measurement. The direction in which plate nutation is taking place provides a means by which sets of electromagnets 40 should be next energized so that any specific orientation can be commanded by the controller 41. Thus each module $10_1, 10_2, 10_3$ is individually controlled and monitored for the specific location of their respective top plates $14_1, 14_2$ and $14_3$. Thus they can be made to assume any specific configuration in space.

It is to be noted that the modular assembly shown in FIG. 1 can be also used as a gimbal system for a pointing device, not shown, to scan a cone in space. Such an application is suited for such an arrangement because it can scan in a continuous manner without changing speed or direction. Additional applications include end-effectors, pumps, and high gear reductions. The two most important attributes of the flexible robotic arm in accordance with this invention are its flexibility and obstacle avoidance capability; however, its performance will be directly proportional to the number of modules utilized.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

We claim:
1. A flexible robotic arm, comprising:
    a plurality of serially connected modules wherein each module includes,
    a metallic base plate having a top surface,
    a metallic top plate pivotally connected to the base plate and having a beveled bottom surface so as to conically nutate around the top surface of the base plate,
    said base plate further having permanent magnet means located at the center and a plurality of energizable electromagnets arranged in a ring around the perimeter for generating a localized magnetic field for at least magnetically attracting thereto a predetermined peripheral portion of the top plate; and means for connecting predetermined base plates of said modules to adjacent top plates thereof.

2. The robotic arm as defined by claim 1 wherein said means for connecting base plates to adjacent top plates comprises a respective interface plate.

3. The robotic arm as defined by claim 2 wherein said base plate, said top plate and said interface plate are comprised of generally circular plate members.

4. The robotic arm as defined by claim 1 and additionally including centrally located pivot means between said base plate and said top plate.

5. The robotic arm as defined by claim 4 wherein said pivot means comprises a universal joint assembly.

6. The robotic arm as defined by claim 1 wherein each of said electromagnets includes a cylindrical type pole piece facing a peripheral portion of said top plate and an electrically energizable coil wrapped around said pole piece.

7. The robotic arm of claim 6 wherein said plurality of electromagnets are energizable in sets of three electromagnets.

8. The robotic arm of claim 7 and additionally including means for energizing each said set in a predetermined sequence to produce a nutational type rotation of said top plate.

9. The robotic arm as defined by claim 6 wherein the peripheral portion of said top plate includes a rim portion facing said pole pieces.

10. The robotic arm as defined by claim 9 wherein said rim portion comprises a depending generally circular rim portion facing said pole pieces.

11. The robotic arm as defined by claim 6 wherein said permanent magnet means comprises a generally flat ring type permanent magnet centrally located on the top surface of said base plate.

12. The robotic arm as defined by claim 11 and additionally including a generally flat spacer member located on top of said ring type permanent magnet for contacting the beveled bottom surface of the top plate.

13. The robotic arm as defined by claim 12 wherein said top surface of the base plate and spacer member are generally circular and of a size to match the size of said ring type permanent magnet.

14. The robotic arm as defined by claim 13 wherein said spacer member comprises a metallic member for completing a closed loop flux path between said top plate and said base plate.

15. The robotic arm of claim 1 wherein each module additionally includes proximity sensing means for determining the position of said top plate relative to said base plate.

16. The robotic arm of claim 15 wherein said proximity sensing means comprises a capacitive type sensor including first capacitor plate means located on the upperside of said base plate inwardly adjacent said ring of electromagnets and second capacitor plate means located on the underside of said top plate inwardly adjacent said peripheral portion thereof opposite said first plate means.

17. The robotic arm of claim 16 wherein said proximity sensing means comprises an electromagnetic type sensor located inwardly of said ring of electromagnets in the spacing between said base plate and said top plate.

18. The robotic arm of claim 17 wherein said sensor comprises at least one linear variable differential transformer actuated in response to the rotational position of said top plate.

19. The robotic arm of claim 18 wherein said sensor comprises a pair of selectively spaced apart linear variable differential transformers.

20. The robotic arm of claim 19 wherein said linear variable differential transformers are spaced in mutually quadrature relationship.

* * * * *